United States Patent

Ulvestad

[11] 3,893,833
[45] July 8, 1975

[54] COMPARTMENTED PULSE JET DUST COLLECTOR

[75] Inventor: Edward A. Ulvestad, Naperville, Ill.

[73] Assignee: Flex-Kleen Corporation, Chicago, Ill.

[22] Filed: Apr. 26, 1972

[21] Appl. No.: 247,701

[52] U.S. Cl. .................. 55/273; 55/283; 55/287; 55/288; 55/293; 55/302; 55/341; 55/527
[51] Int. Cl.² ................ B01D 29/28; B01D 46/04
[58] Field of Search ............. 55/159, 226, 160, 262, 55/161, 266, 162, 270, 271, 272, 273, 283, 286, 284, 287, 293, 302, 303, 304, 341, 342, 343, 344, 419, 420, 486, 487, 527

[56] References Cited
UNITED STATES PATENTS

| 2,933,154 | 4/1960 | Lauterbach | 55/528 |
| 3,078,646 | 2/1963 | Leech et al. | 55/303 X |
| 3,097,936 | 7/1963 | Lincoln | 55/273 |
| 3,217,468 | 11/1965 | O'Dell | 55/273 X |
| 3,266,225 | 8/1966 | Barr | 55/273 |
| 3,368,328 | 2/1968 | Reinauer | 55/302 X |
| 3,394,532 | 7/1968 | Oetiker | 55/302 |
| 3,436,899 | 4/1969 | Pausch | 55/302 |
| 3,513,638 | 5/1970 | Young | 55/273 |
| 3,521,430 | 7/1970 | Vanderlip et al. | 55/283 |
| 3,606,736 | 9/1971 | Leliaert et al. | 55/302 |
| 3,646,595 | 2/1972 | Williams | 55/341 X |
| 3,680,285 | 8/1972 | Wellan et al. | 55/302 |

OTHER PUBLICATIONS

Dustex Div. of American Precision Industries Inc. "R.A. Packaged Dust Collector" Bulletin 311, 55–302.
"The Mikro–Pulsaire Dust Collector" Advertised by Pulverizing Machinery Division of Slick Industrial Company, Chatham Road, Summit, New Jersey 07901, Bulletin PC-2.
"Flex Kleen Custom Engineered Dust Collectors" Flex-Kleen Corporation, 407 South Dearborn St., Chicago, Ill. 60605, Bulletin No. T-7.

*Primary Examiner*—Frank W. Lutter
*Assistant Examiner*—N. F. Greenblum

[57] ABSTRACT

Compartmentized pulse jet dust collector systems employ a damper control and cleaning pulse cycle to make the jet pulse cleaning action effective to remove deeply lodged fume particles from the filter media thereby avoiding progressive blinding and enabling long term bag performance at efficient air-to-cloth flow ratios.

4 Claims, 13 Drawing Figures

3,893,833

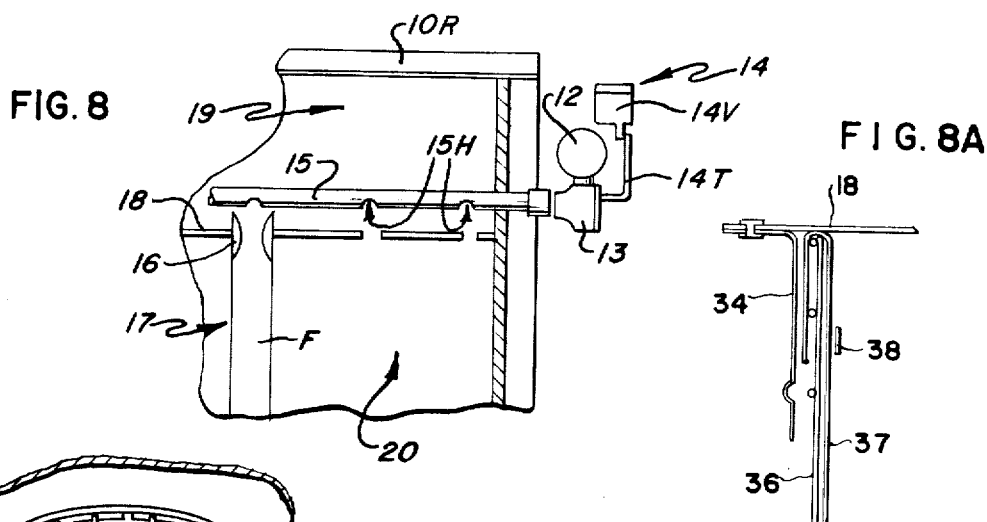
FIG. 8
FIG. 8A
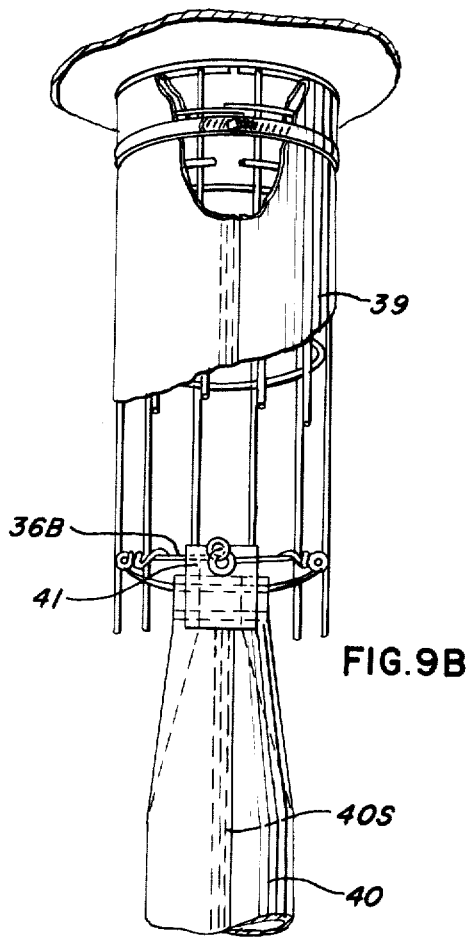
FIG. 9B
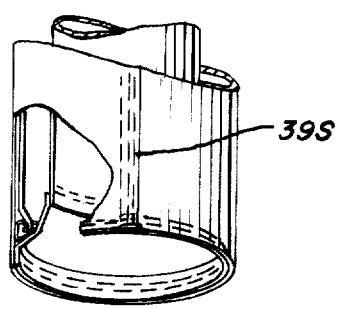
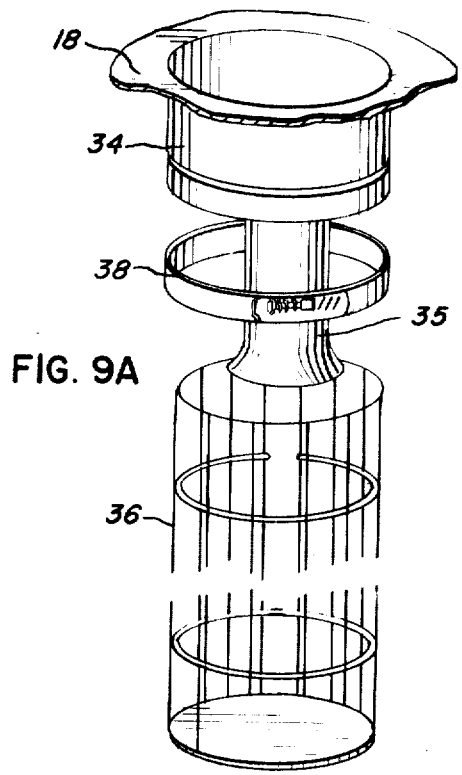
FIG. 9A
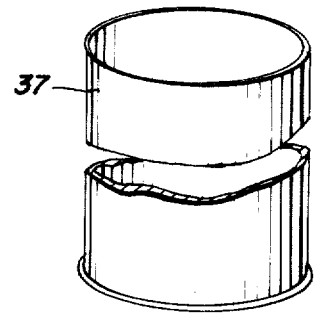

COMPARTMENTED PULSE JET DUST COLLECTOR

BACKGROUND OF THE INVENTION

The continuous flow dust collectors of the type that are cleaned by a reverse flow pulse jet have long been used and are of proven merit in respect to shakers or low pressure reverse flow types of dust collectors in that the pulse jet type operates at substantially higher air-to-cloth ratios than shakers or low pressure reverse flow types and has a high degree of cleaning efficiency with relatively small usage of compressed air. Typically, the standard pulse jet collector will operate at air-to-cloth ratios about three times the air-to-cloth ratios of the other types of collectors.

The standard pulse jet collector has primarily been used for handling standard type dusts such as carbon black, cement, flour and the like for which it has demonstrated acceptable performance on a long term basis; for example, over a six month interval. Satisfactory long term performance is primarily determined based on the ability to operate at the higher air-to-cloth ratios without causing premature blinding of the bags or premature failure of the bags.

The result of the higher air-to-cloth ratios and the high cleaning efficiency of the pulse jet collector is that a pulse jet collector of any given capacity is more compact than the older designs, thereby reducing manufacturing and shipping costs, as well as affording more flexibility in mounting location due to the smaller floor space requirements.

The application of the standard pulse jet collector to fume recovery systems which are characterized by extremely fine fume particles has encountered such difficulties as shortened bag life and premature bag plugging or blinding when operating at the higher air-to-cloth ratios normally employed for the standard type dusts. Actual performance tests have shown that the standard pulse jet type collector, when handling extremely fine fume particles, for example, such as are encountered in aluminum reduction applications, has not established a satisfactory long term performance capability at the higher air-to-cloth ratios. The air-to-cloth ratios that permit acceptable long term performance of the standard pulse jet collector are too low, as applied to fume recovery systems, to make such applications economically feasible.

SUMMARY OF THE INVENTION

The present invention provides for improvements in the pulse jet type of dust collector systems in order to achieve long term operation on fume recovery applications at the higher air-to-cloth ratios, at which the standard pulse jet device typically functions when used with standard type dust.

More particularly, the dust collector system of this invention is intended for application to fume recovery for the purpose of reducing the amount of compressed gas required per cfm of carrier gas; and for assuring stable operating conditions at the relatively high air-to-cloth ratios of pulse jet types so that premature blinding is avoided while enabling less frequent pulse jet cleaning per bag resulting in a lower rate of abrasion and wear on the bag.

In accordance with this invention, a dust collector system consisting of an array of basic pulse jet dust collectors (either of modular or composite form) has each collector unit equipped with a damper for cutting off the flow of carrier gas through the particular unit to reduce the upward gas velocity between the filter bags in the dirty air plenum during pulse cleaning thereof, all controlled by a programming timer connected to sequence the damper actuations and the cleaning pulse cycles for each of the units in a unique fashion capable of dislodging the extremely fine fume particles much more effectively while maintaining effective filtering operation.

Other features and advantages of the invention will be apparent from the following description and claims and are illustrated in the accompanying drawings which show structure embodying preferred features of the present invention and the principles thereof, and what is now considered to be the best mode in which to apply these principles.

DESCRIPTION OF THE DRAWINGS

In the accompanying drawings forming a part of the specification and in which like numerals are employed to designate like parts throughout the same:

FIG. 8 is a fragmentary sectional view showing the general arrangement of the orifice, venturi nozzle and filter bag system;

FIG. 8A is a detailed section of the bag mounting;

FIG. 9A is a view of a standard bag mounting;

FIG. 9B is a view showing another form of filter bag mounting;

DESCRIPTION OF PREFERRED EMBODIMENT

Figure 1:
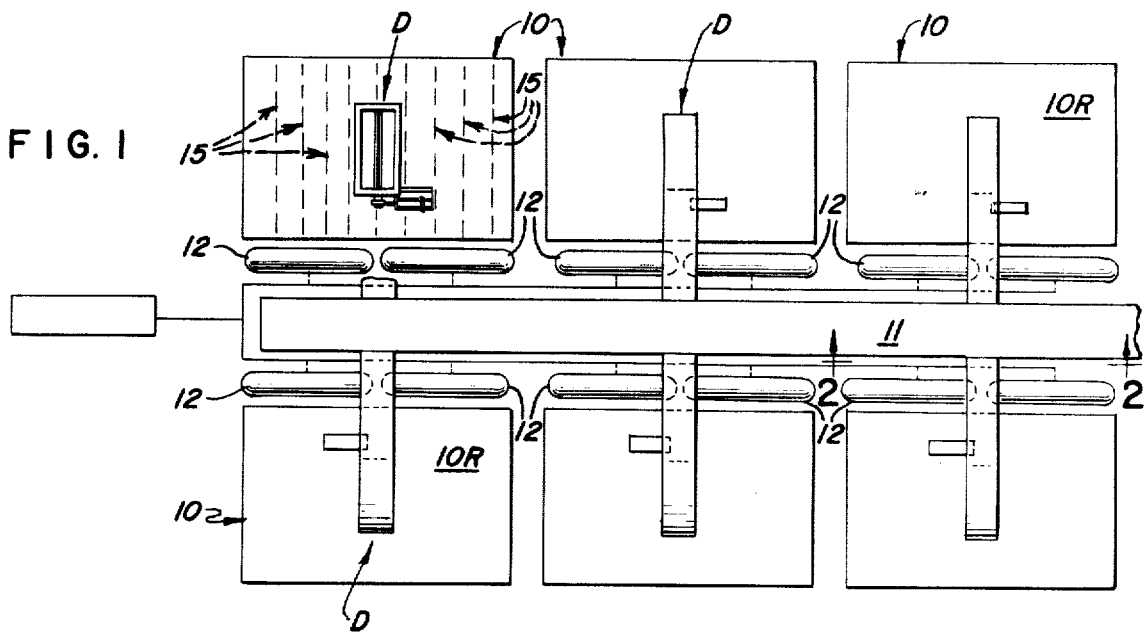
FIG. 1 is a plan view of a modular type dust collector system for fume recovery applications.

Referring now to the drawings, the dust collector system of this invention concerns the use of a multiplicity of basic pulse jet type dust collector units which may be in the form of individually housed units or which may be separate compartments of a composite housing.

Figure 2:
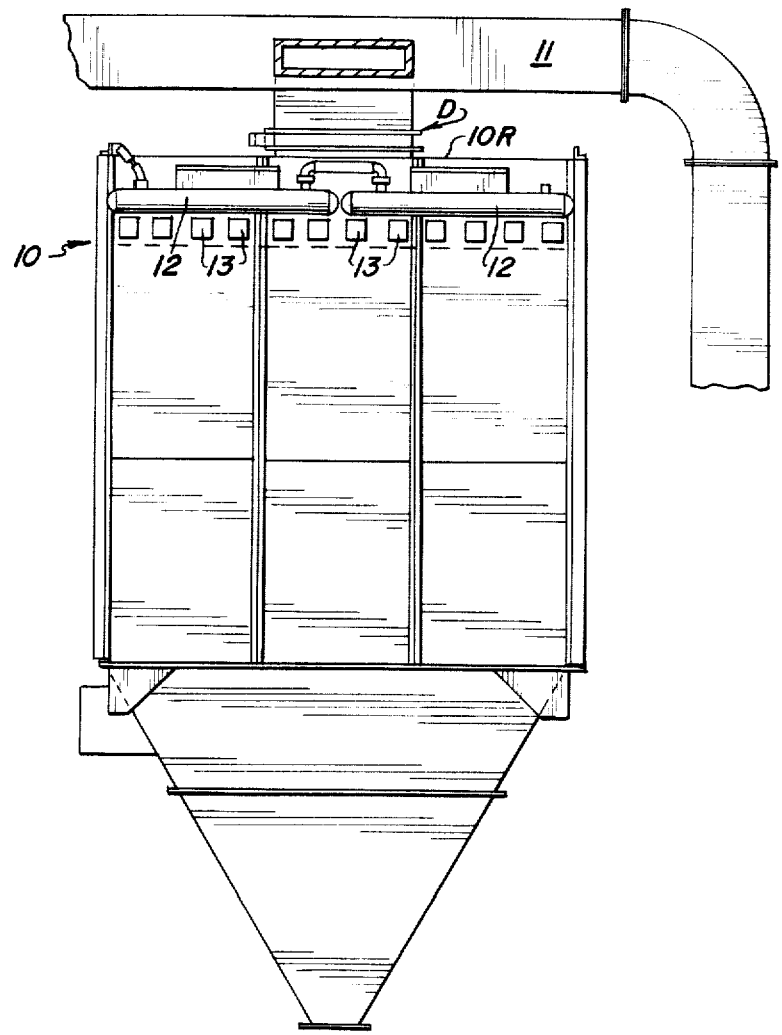
FIG. 2 is a side view of one of the modular type dust collector units and is taken on the line 2—2 of FIG. 1.

For purposes of illustration, a modular system embodiment as illustrated in FIGS. 1 and 2 comprises a set of six individually housed units 10 connected to supply a common clean gas outlet duct 11 which may go to atmosphere or may be recycled or may go through a discharge fan, depending on the particular application.

Figure 10:
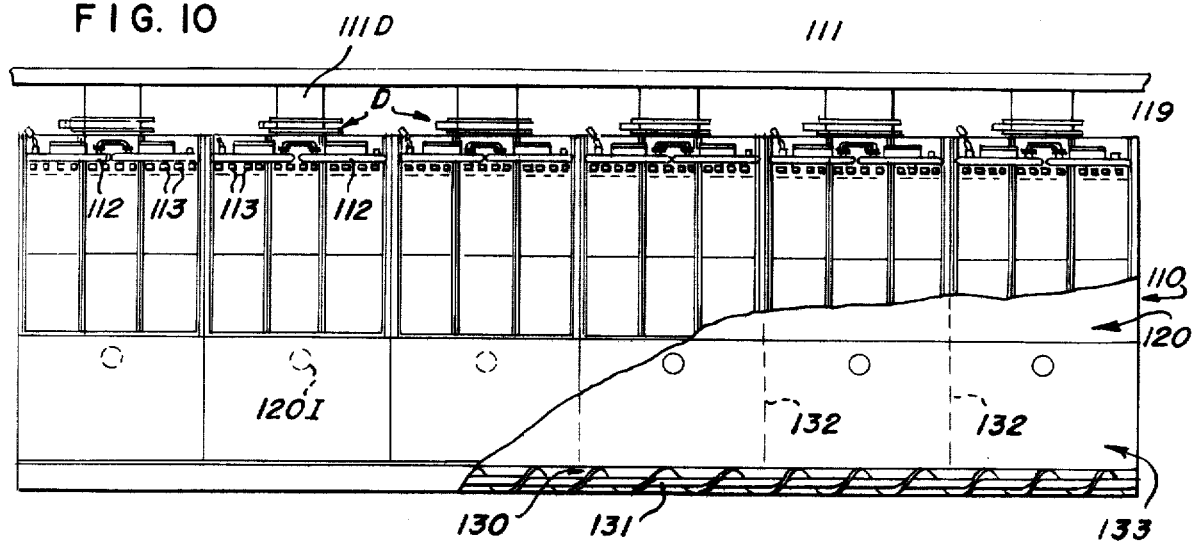
FIG. 10 is a side elevational view of the composite dust collector system constructed in accordance with the present invention.

In FIG. 10, a composite system embodiment is shown wherein a common housing 110 incorporates a set of 6 compartments arranged in single file relation to supply a common outlet duct 111.

Figure 6:
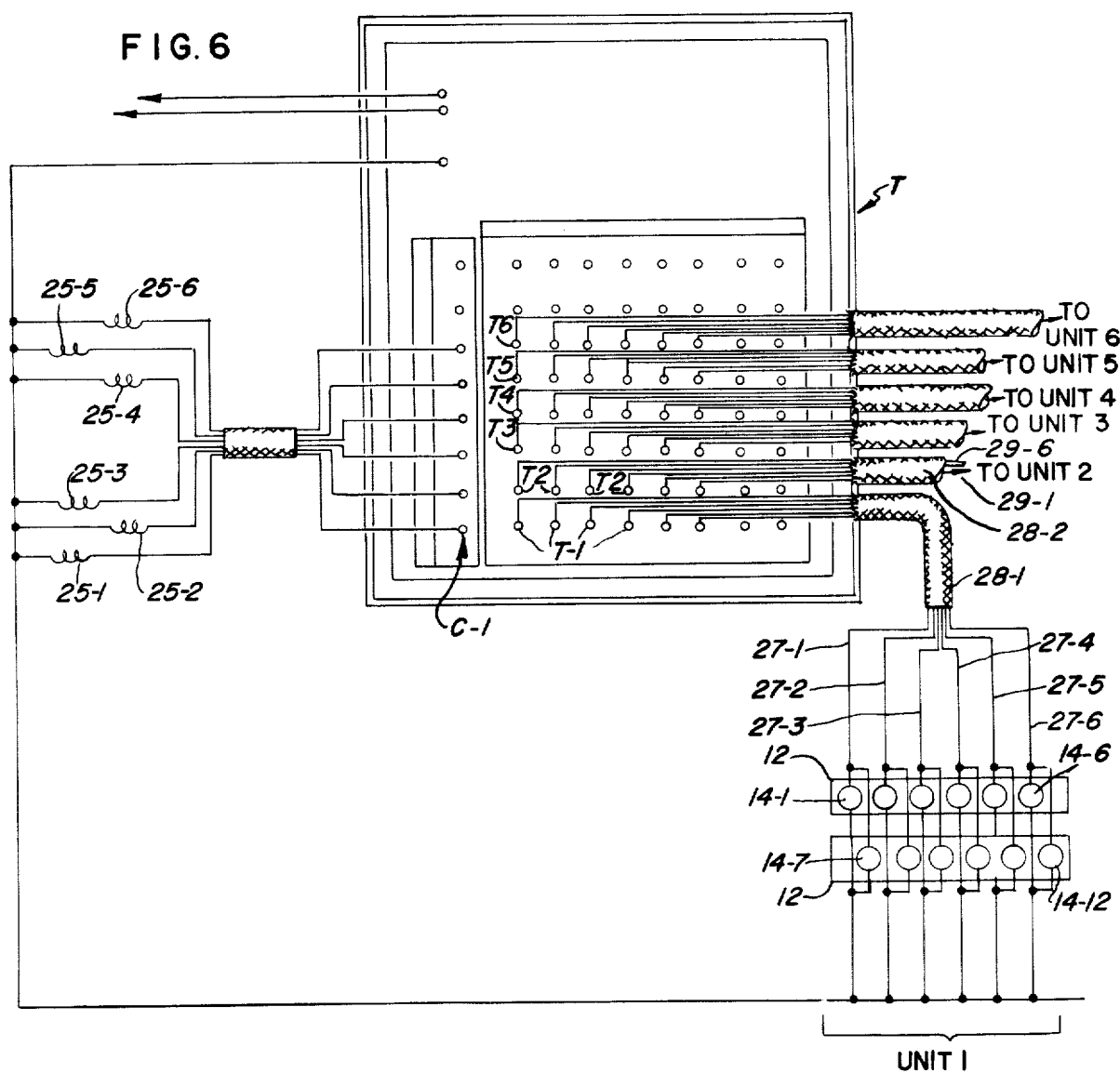
FIG. 6 is a schematic wiring diagram showing the connection of a programming timer to control the sequencing of the solenoids that actuate the dampers and the diaphragm valves for the modular units.

Referring to the modular embodiment shown in FIGS. 1 and 2, it will be noted that in the arrangement illustrated herein for purposes of disclosure each dust collector unit 10 is equipped with a pair of external compressed gas headers 12. As best shown in FIGS. 1, 2 and 8, each of the headers 12 serves as a common source for a set of 6 diaphragm valves 13, each of which is controlled by an individual pulse jet solenoid 14. Thus, there are a total of 12 pulse jet solenoids 14 for each collector unit 10. In FIG. 6, the solenoids for collector unit No. 1 are designated 14-1 to 14-12. A gas distribution pipe 15 leads from each diaphragm valve 13, each pipe 15 having eight downwardly directed holes 15H spaced therealong, accurately registered with respect to the outlet passage 16 of a corresponding nozzle and bag assembly 17. It is presently preferred to utilize a venturi type outlet passage 16, but it is contemplated that the reduced can velocity during the cleaning cycle will allow effective cleaning of fume particles from bag surfaces with straight walled or other types of outlet passages. In the embodiment illustrated in FIGS. 1 and 2, therefore, each dust collector unit 10 has a total of 12 gas distribution pipes 15, each pipe 15 (see FIG. 8) having a set of eight holes 15H to service an array of 96 bag assemblies 17. The bag assemblies 17 are supported from a tube sheet 18 in a conventional manner to divide each of modular housing units 10 into an upper clean air plenum 19 where the distribution pipes 15 are located and a lower dirty air plenum 20 where the bag assemblies 17 are located. The six modular units 10, therefore, incorporate a total of 576 bag assemblies 17.

It is to be noted that each pulse jet solenoid 14 controls a solenoid valve 14V that is connected through ⅛ inch tubing 14T to the diaphragm valve 13 served by the air header 12. When a solenoid valve 14V actuates, the pressurized air acting on the diaphragm valve 13 is vented to atmosphere or to a low pressure region which may be interior of the collector in the case of a deadly carrier gas system, thus allowing the diaphragm valve 13 to open for admitting a surge of compressed air into the gas distribution pipe 15 to exit substantially simultaneously from each of the eight holes 15H to produce eight pulse jets. The burst-type blow-back effect of each pulse jet on the associated passage 16 is determined by the operating pressure, the spacing from the pipe hole 15H to the corresponding passage and the sizing of the pipe hole and the outlet passage, all in a well-known fashion long employed in the case of standard pulse jet dust collectors. These factors are correlated to achieve maximum blow-back and cleaning effect.

In accordance with the system of this invention, each of the modular units 10 is provided with a damper D for controlling flow of carrier gas through the filter media F of the bag assemblies 17. In the illustrated arrangement, a damper D is shown mounted centrally on the roof 10R of each modular unit and, as illustrated in the detail views of FIGS. 3 to 5, includes a butterfly-type of damper blade 21 journalled in a valve housing 22 and connected to a bell crank 23 which is actuated by an individual air cylinder unit 24 under the control of a damper solenoid 25 that regulates an air line 26 which supplies compressed air to actuate the air cylinder 24. An electric motor arrangement may be used in place of the cylinder unit 24.

The system is controlled by programming timer means T (FIG. 6) which is individually connected to each of the six damper solenoids 25-1 to 25-6 and to each pulse jet solenoid 14 to synchronize the actuation of the pulse jet solenoids with their corresponding damper solenoids. Thus, the timer T is connected to define separate sets of solenoids, there being one solenoid set corresponding to each dust collector unit 10. Thus, for collector unit 1, the set of timer contacts includes a contact C-1 for the damper solenoid 25-1 and a plurality of contacts T-1 for the diaphragm solenoids 14. The timer T is programmed to operate the six collector units 10 is sequence; for example, from collector unit No. 1 through collector No. 6.

In the illustrated arrangement, the timer contacts T-1 are connected through wires 27-1 to 27-6 that lead through a protective sheath 28-1 to the pulse jet solenoids 14-1 to 14-12 for operating the solenoids 14-1 to 14-12 in pairs in a six-step sequence of two-cycle duration. For example, solenoids 14-1 and 14-7 are operated simultaneously, thereafter solenoids 14-2 and 14-8 are operated simultaneously and so on through a six step cycle, the cycle then being repeated with solenoids 14-1 and 14-7 being operated simultaneously and solenoids 14-2 and 14-8 being operated simultaneously and so on. Thereafter, the solenoids of collector unit No. 2 are operated in the same type of a paired two-cycle sequence. Thus, the timer contacts T-2 are connected to wires 29-1 to 29-6 that lead through a protective sheath 28-2 to a similar set of 12 pulse jet solenoids associated with collector unit No. 2. Correspondingly, timer contacts T-3 through T-6 are connected to control the sets of pulse jet solenoids for units No. 3 through 6.

Figure 7:
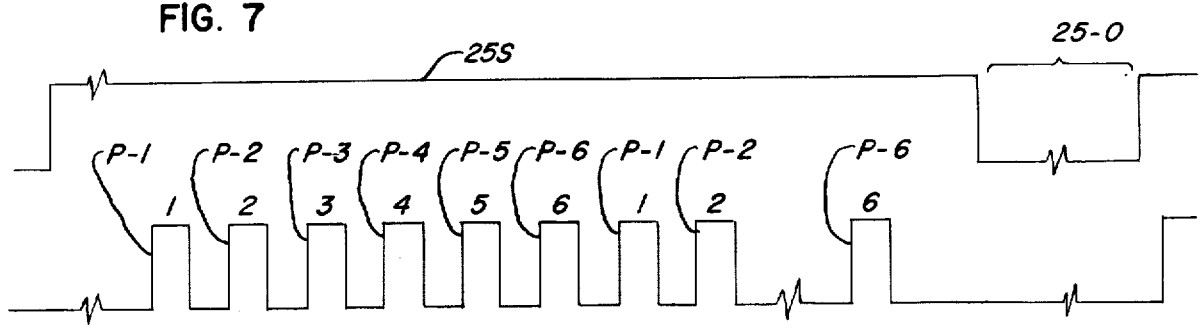
FIG. 7 is a timer programming logic chart illustrating the timing sequence of the solenoid operating signals for the dampers and diaphragm valves.

A time control chart for illustrating the operating logic program of the damper valve and the pulse solenoid valves is shown in FIG. 7. It will be noted that the pulse solenoids for collector unit No. 1 are operated during the time when the operating signal 25-S for the damper solenoid 25-1 is on. Typically, the "closed" time range for each damper solenoid is 20 to 60 seconds, this being adjustable in accordance with the number of bags and the particular application. The off time 25-0 between the operation of damper solenoid 25-1 and damper solenoid 25-2 typically ranges from 5 seconds to 10 minutes, this also being adjustable in accordance with conditions. Each individual pulse P-1 to P-6 has an on time of 100 to 150 milli-seconds with the off time between the successive pulses typically being from about 1 to 4 seconds. By comparison, in the standard pulse jet collector, the off time between successive pulses typically ranges between about 3 and 30 seconds.

As stated previously, the standard pulse jet collector is not satisfactory for the fine particle sized encountered in fume collection applications, this being determined by actual performance tests to evaluate the long term effect upon the filter media. Such performance tests have shown that the pressure drop across the filter media at the typical air-to-cloth ratios of standard pulse jet collector systems progressively increases with continued use until the filter media becomes blinded. For example, the blinding may occur after several months in the case of the standard pulse jet collector, even though it is constantly subjected to the pulse jet cleaning cycle.

It is believed that the blinding phenomenon occurs as a result of the particular structure of the filter media conventionally employed for standard pulse jet dust collectors. A needled felt bag with scrim such as is typically employed in pulse jet collectors is characterized by a grid or scrim central layer sandwiched between external batt layers of polyester or other suitable material needled thereon so that the fibers of the batt layers are forced into the grid interstices in a random pattern which is effective to subdivide the relatively large grid openings into a myriad of interstices. As an estimate, there may be as many as several thousand interstices per square inch of grid. Such a needled felt bag structure has proven to be capable of allowing high velocity through-flow in the case of standard pulse jet type dust collectors applied to standard-type dusts. In the cas of the fine or fume particles, it is believed the extremely small particles lodge so deeply and intimately within the interstices between the fibers as to preclude removal by the standard pulse jet stream. This effect is progressive, causing the pressure drop across the filter media to continuously build up. Actual life type performance tests show that the standard collectors, when applied to fume recovery systems, do not develop a stable long term pressure drop.

To further illustrate the blinding problem, it should be noted that where the standard pulse jet collector handles standard dusts, the cleaning action due to the pulse jet dislodges the particles, some of which fall completely down to the hopper in the space between the bags, even though there is at all times a perceptible can velocity effect, namely, an upward air flow in the inter-bag regions at the lower extremities of the bags. Some of the dislodged particles will drop or step part way and return to the filter media to be subsequently dislodged and continue stepping down until they clear the lower end of the bag. It is believed that in the case of extremely fine fume particles, the can velocity effect is such that there is much greater difficulty in dislodging any given particle and that, in addition, some of the dislodged particles, instead of falling down, will actually rise and return to the filter media at a higher elevation. In the standard pulse jet type collector, the "can" velocity is greatest at the lower ends of the bags and diminishes substantially to zero near the upper ends of the bags.

In the operation of the present invention, it will be noted that when any given bag is being pulse jet cleaned, the damper 21 controlling the carrier gas flow through the bag is closed so that the can velocity effect is eliminated during pulsing. Since there is close to zero air flow into the bag, momentary reverse pressure due to the cleaning pulse is capable of more easily dislodging even deeply imbedded fume particles, Under typical operating conditions where the pressure of the cleaning gas is in a range of about 60 to about 100 PSIG, the pulse jet flow is typically 0.8 SCFM per bag, S referring to standard conditions of one atmosphere of pressure and 70° F.

With reference to the timing cycle illustrated in FIG. 7, it will be noted that an individual pulse interval P-1 is typically about 0.100 seconds and the off time between pulsing of the same bag during a two cycle sequence as described can be substantially less than in the case of the two cycle timing sequences for the standard pulse jet collectors. There is, in addition, a pulse off interval while the damper remains closed to allow more complete falloff and deposit of the particles without interference by can velocity effects.

The time between successive two cycle sequences, however, is substantially greater for the present arrangement resulting in each bag being cleaned less frequently. However, the more effective cleaning achieved by an individual pulse results in each bag being pulsed less frequently which is accomplished through the fact that this unit has only one compartment cleaning at one time, whereas the standard pulse jet has all bags being cycled for pulsing continuously.

The important effect of the development is the attainment of a long term stability of the pressure drop across the filter media, even at relatively high air-to-cloth ratios. The system reduces the amount of compressed cleaning air required and it reduces the number of pulses for maintaining the bag in a sufficiently cleaned stable condition so that the pulse cleaning action is applied less frequently to each bag. This is important for minimizing the mechanical abrasion occurring following the collapse of the bag against its cage, thus reducing wear due to such abrasion.

Figure 3:
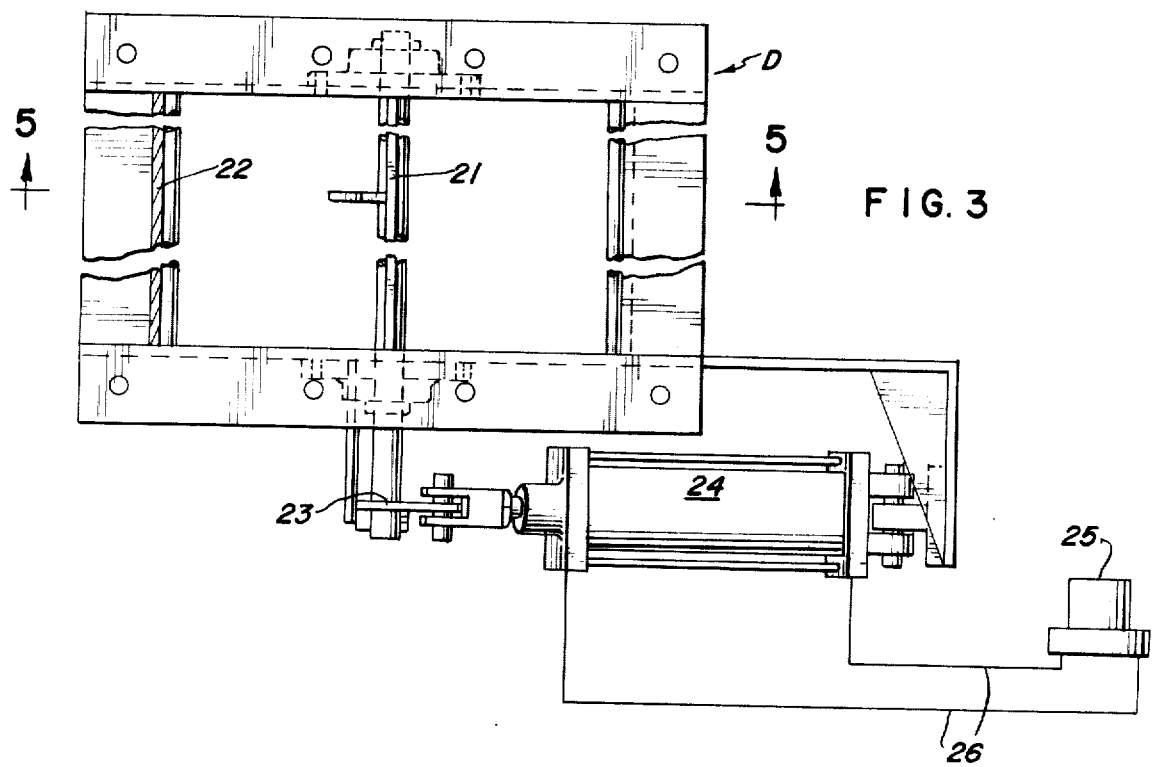
FIG. 3 is an enlarged top plan view of a damper mechanism such as is mounted in the outlet of the clean air plenum of each of the modular units.
Figure 4:
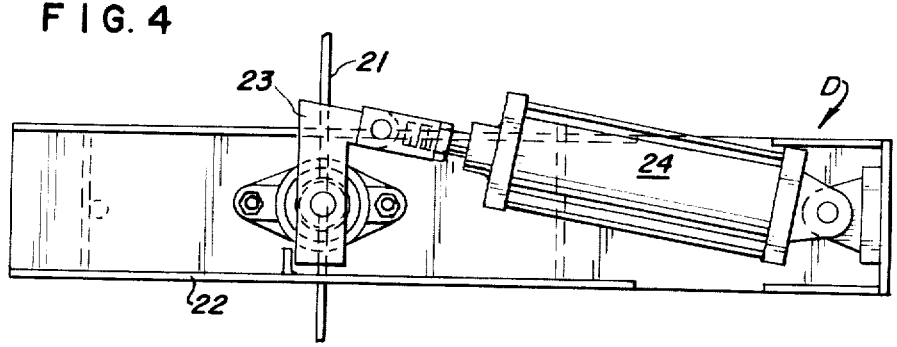
FIG. 4 is a side elevational view of the damper mechanism of FIG. 3.
Figure 5:
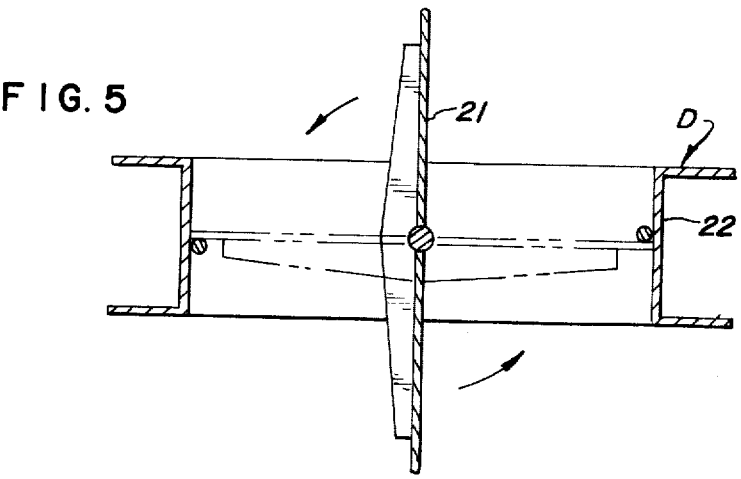
FIG. 5 is a transverse section taken on the line 5—5 of FIG. 3.

For completeness of disclosure, the composite embodiment of FIG. 10 is described briefly. Each of the compartments 110 includes an entrance or dirty air plenum 120 having a carrier gas inlet 1201 and a clean air plenum 119 having an outlet duct 111D provided with a damper D arranged and controlled as shown in FIGS. 3 to 5. A common screw conveyor trough 130 underlies the entrance plenums and includes a common auger 131 for removing the separated solids. A conventional tube sheet (not shown) divides the plenums 119, 120 and supports an array of bag assemblies that are disposed in the dirty air plenum.

Corresponding elements for the modular and composite units are identified by corresponding reference characters in the 100 series. Thus, each compartment of the composite system is equipped with compressed gas headers 112 and diaphragm valves 113 and control solenoids. In the illustrated arrangement, the clean air plenums 119 are separated from each other by means of intermediate compartment walls in accordance with the preferred practice of the invention. The entrance of dirty air plenums are also separated by a compartment wall 132 that terminates at the hopper bin line. Full compartmentizing of dirty air plenums is desired where the number of bags per compartment is small and the value of the full compartmentizing is reduced as the number of bags per compartment is increased.

As shown, each unit has a separately compartmented hopper, however, the partition walls 132 may terminate at the hopper bin line to provide a common hopper which may be fed from a single inlet located in one of the end walls.

A standard bag assembly 17 as shown in the exploded view of FIG. 9A is suitable for use either in the modular embodiment or in the composite embodiment. The standard bag assembly 17 is shown to include a bag cup 34 attached to the tube sheet 18 and serving as a mount for nozzle 35, a bag cage 36 and a sock shaped bag 37. As is conventional, the top margin of the bag 37 is turned inwardly over the top of the cage. The bag and cage assembly telescopes over the bag cup 34 and is secured by a quick acting clamp 38, with the top margin of the bag acting as a seal against the cup.

During normal carrier gas flow, the bag is continuously impressed against the cage and the filtered solids lodge the interstices of the filter media and gradually accumulate on the exterior of the media. During cleaning, as taught in the present disclosure, the closure of the corresponding damper is timed to effectively eliminate the can velocity effect and also to permit the filter media to relax. The cleaning pulse inflates the bag and, in the absence of the can velocity, produces sufficient through flow to dislodge even the particles embedded in the interstices while minimizing the abrasion and wear on the bag by reducing the return contact of the bag with the cage.

Another bag assembly to which the invention is applicable is shown in FIG. 9B as including a convention bag cup 34, nozzle 35, and bag case 36. The filter bag includes an external sockshaped media section 39 having its top margin turned inwardly and clamped against the bag cup 34 by clamp 38. An internal sockshaped filter media section 40 extends upwardly in clearance relation to the bag cage and terminates in a pinched upper end that is sealed by a tab 41 that is supported on a cross bar 36B of the cage. Each of the filter sections 39, 40 is formed with a vertical seam 39S, 40S respectively, and the lower ends of the sections are overlapped and joined by a circular seam 42.

During normal carrier gas flow, the exterior filter section 39 is continuously impressed against the bag cage as previously described while the internal section 40 is expanded towards the bag cage without blocking carrier gas flow through either filter section. During cleaning, the closing of the damper reduces the can velocity effect on both sections and allows the cleaning pulse to produce reverse flow through both filter sections for dislodging the embedded particles from the interstices of the media.

Figure 11:
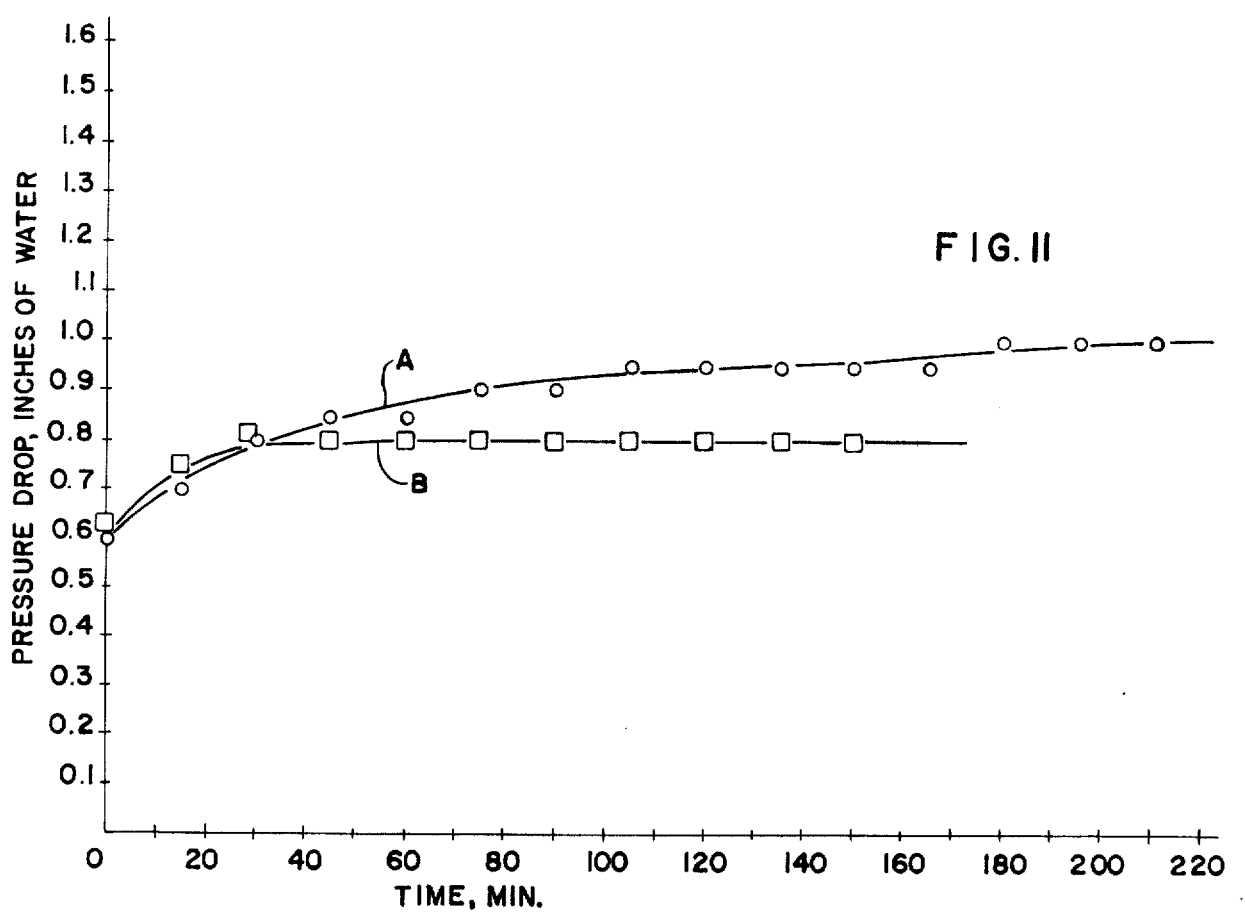
FIG. 11 is a graph illustrating comparative performance of prior art pulse jet collectors and the present compartmentized system with respect to pressure drop and air-to-cloth flow ratios.

Actual tests showing the performance of the standard bag arrangement of FIG. 9A are given in FIG. 11 which illustrates the short term pressure drop characteristics across the filter media. Curve A applies to the conventional prior art pulse jet collector when used on a fine dust (or a fume) recovery application and operated at an 8 to 1 air to cloth ratio. Curve B applies to the dampered pulse jet collector system of this invention for the same recovery application and also operating at an 8 to 1 air to cloth ratio.

For purposes of illustrative disclosure, the damper pulse jet system for which curve B of FIG. 11 was derived employed a timing pulse sequence of the type shown in FIG. 7 wherein the damper pulse 25S is initially applied for an interval up to 10 seconds before the first cleaning pulse P-1. This interval is chosen to insure closure of the damper and reduction of can velocity prior to the actual cleaning pulse cycles. Correspondingly, the last cleaning pulse is terminated for an interval up to 10 seconds before closure of the damper to insure adequate settling time for the dislodged solids. The data for curve B was derived for a pulse sequence characterized by pulse off times of 6 seconds with pulse intervals of 0.1 second.

These short term curves show that the pressure drop for the prior art pulse jet collector progressively increases with continued operation whereas the pressure drop for the dampered pulse jet system rapidly stabilizes and thereafter remains level. The progressive increase in the prior art system is a result of the progressive blinding of the media by the extremely fine dust or fume particles that lodge in the interstices so as to resist removal by the cleaning pulses. The blinding effect becomes more pronounced and limits the bag performance to an unacceptably short life time.

It has also been found that somewhat lower air to cloth ratios still can cause a progressive blinding effect (particularly noticeable on a long term basis) in the case of the prior art dust collectors so as to unduly limit the useful lifetime of the filter media for fume and fine non-agglomerating dust applications.

Thus, while preferred constructional features of the invention are embodied in the structure illustrated herein, it is to be understood that changes and variations may be made by those skilled in the art without departing from the spirit and scope of the appended claims.

What is claimed is:

1. In a dust collector system that includes a plurality of pulse jet dust collector units for filtering operation with carrier gas at typical pulse jet air-to-cloth flow ratios; each collector unit conventionally including a dirty air plenum, a clean air plenum above the dirty air plenum, a plurality of compressed air gas distribution pipes mounted in each clear air plenum, each of said pipes having a plurality of orifices, a plurality of assemblies supported in the dirty air plenum and each comprising a conventional needled felt filter bag mounted to filter incoming carrier gas and outlet means providing an outlet passage for directing filtered air into the clean air plenum, each of said outlet means comprising a venturi nozzle, each assembly of filter bag and outlet means being in jet pulse cleaning relation to a separate one of said orifices, for directing a pulse jet through the filter bag in a direction opposite to normal can velocity flow therethrough and a plurality of first actuating means for separately controlling supply of compressed gas at a pressure from about 60 to about 100 PSIG to different ones of said pipes; and timer means for controlling actuation and sequencing of the first actuating means of all of said collector units; an improved arrangement for cleaning the filter bags for maintaining normal bag life at stable air-to-cloth flow ratios when applied to the recovery of extremely fine fume particles from a carrier gas, said arrangement including a common clean gas outlet duct, separate duct means establishing individual communications between each of said clean air plenums and said common duct, separate damper means for controlling flow of carrier gas from each of said clean air plenums through the corresponding one of each separate duct means and into said common duct, and a plurality of second actuating means each controlling one of said damper means, said timer means connecting the first and second actuating means in separate composite sets, each of said last-named sets consisting of the plurality of first actuating means corresponding to a predetermined one of said collector units and the second actuating means corresponding to the same collector unit, said timer means including means for sequentially energizing the composite sets at time spaced intervals and means for energizing the actuating means of each composite set in a sequence wherein the corresponding damper means closes for a predetermined damper interval that is from about 20 to about 60 seconds in duration to allow the can velocity of the corresponding collector unit to become and remain minimal and wherein each of the corresponding first actuating means operates in a predetermined sequence of time spaced pulse intervals occurring at a time when the can velocity is minimal, the first pulse interval beginning about 10 seconds after the beginning of its corresponding damper interval and each pulse interval being from about 100 to about 150 milliseconds in duration and the off time between successive pulse intervals being from about one second to about 4 seconds in duration such that each pulse jet acts to dislodge the extremely fine fume particles from within a myriod of interstices in the corresponding filter bag for free fall while the can velocity remains minimal.

2. In a dust collector in accordance with claim 1 and wherein each of said first actuating means comprises a solenoid operably connected to one diaphragm valve to control supply of compressed gas to one gas distribution pipe and wherein each of said second actuating means comprises a solenoid operably connected to position one of said damper means.

3. In a dust collector system in accordance with claim 1 and wherein each of said first actuating means comprises a solenoid operably connected to one diaphragm valve, electrical means connects a pair of said solenoids to control a pair of said diaphragm valves for simultaneously supplying compressed gas to a pair of gas distribution pipes located in spaced apart relation to the same collector unit and wherein each of said second actuating means comprises a solenoid operably connected to control an air cylinder to position one of said damper means.

4. In a dust collector system that includes a plurality of pulse jet dust collector units for filtering operation with carrier gas at typical pulse jet air-to-cloth flow ratios; each collector unit conventionally including a dirty air plenum, a clean air plenum above the dirty air plenum, a plurality of compressed air gar distribution pipes mounted in each clean air plenum, each of said pipes having a plurality of orifices, a plurality of assemblies supported in the dirty air plenum and each comprising a conventional needled felt filter bag mounted to filter incoming carrier gas and outlet means providing an outlet passage for directing filtered air into the clean air plenum, each assembly of filter bag and outlet means being in jet pulse cleaning relation to a separate one of orifices, for directing a pulse jet through the filter bag in a direction opposite to normal can velocity flow therethrough, each of said outlet means comprising a venturi nozzle, and a plurality of first solenoid means for separately controlling supply of compressed gas to different ones of said pipes; and timer means for controlling actuation and sequencing of said first solenoid means of all of said collector units; an improved arrangement for cleaning the filter bags for maintaining normal bag life at stable air-to-cloth flow ratios when applied to the recovery of extremely fine fume particles from a carrier gas, said arrangement including a common clean gas outlet duct, separate duct means establishing communication between each of said clean air plenums and said common duct, separate damper means for controlling flow of carrier gas from each of said clean air plenums through the corresponding one of said separate duct means and into said common duct, and a plurality of second solenoid means each controlling one of said damper means, said timer means having a plurality of composite sets of contacts, one for each of said dust collector units, each set of contacts including a plurality of first contact means for separately controlling the first solenoid means associated with the corresponding dust collector unit, and second contact means for controlling energization of the second solenoid means associated with the corresponding dust collector unit; said timer means including cyclically operating means for individually selecting said sets of contacts in a predetermined sequence of time spaced intervals and sequencing means for energizing the selected set of contacts by maintaining energization of the said second contact means thereof for closing the corresponding damper means for a predetermined damper interval that is from about 20 to about 60 seconds in duration to allow the can velocity of the corresponding collector unit to become and remain minimal and by successively energizing the contacts of said plurality of first contact means thereof in a predetermined sequence of time spaced pulse intervals occurring at a time when the can velocity is minimal, the first pulse interval beginning about 10 seconds after the beginning of its corresponding damper interval and each pulse interval being from about 100 to about 150 milliseconds in duration and the off time between successive pulse intervals being from about one second to about 4 seconds in duration such that each pulse jet acts to dislodge the extremely fine fume particles from within a myriod of interstices in the corresponding filter bag for free fall while the can velocity remains minimal.

\* \* \* \* \*